(No Model.) 2 Sheets—Sheet 2.

C. W. CARTER.
CAR BRAKE.

No. 506,768. Patented Oct. 17, 1893.

Witnesses
J. E. Purple

Inventor
Clarence W. Carter
By Paul &Merwin Atty's

UNITED STATES PATENT OFFICE.

CLARENCE W. CARTER, OF MINNEAPOLIS, MINNESOTA.

CAR-BRAKE.

SPECIFICATION forming part of Letters Patent No. 506,768, dated October 17, 1893.

Application filed February 13, 1893. Serial No. 462,046. (No model.)

*To all whom it may concern:*

Be it known that I, CLARENCE W. CARTER, of the city of Minneapolis, county of Hennepin, State of Minnesota, have invented certain new and useful Improvements in Car-Brakes, of which the following is a specification.

This invention relates to a brake apparatus for railroad or street cars, and the object of the invention is to provide a brake in which there shall be less slack chain in consequence of which the brakes may be more quickly applied or released; and a further and more important object is to provide a brake apparatus which will be additionally and strongly operated by the movement of the cars, and further one in which the force applied will increase in proportion to the weight with which the car is loaded.

My invention consists in general in the constructions and combinations all as hereinafter described and particularly pointed out in the claims, and will be more readily understood by reference to the accompanying drawings forming part of this specification, in which—

Figure 1:
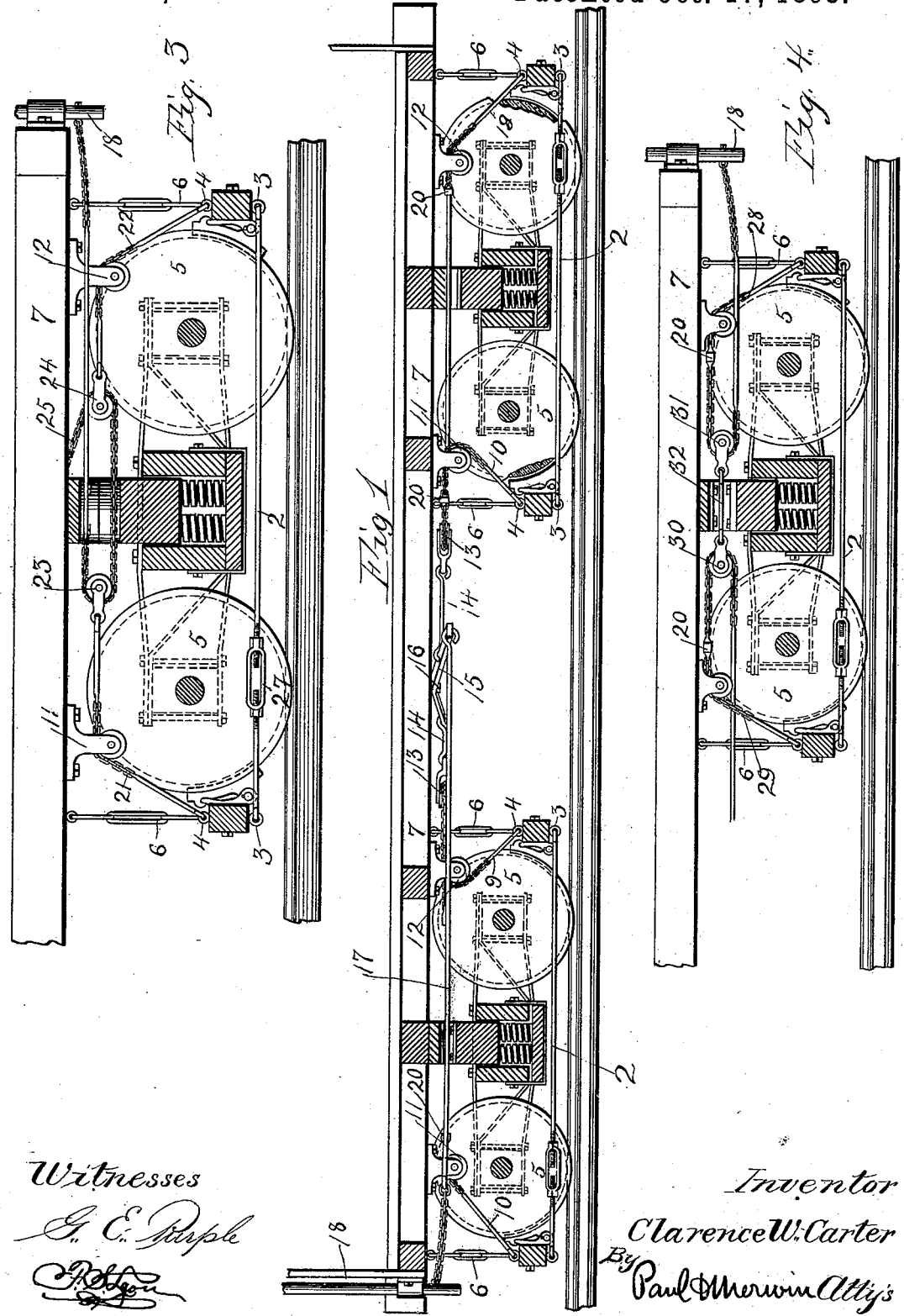
Figure 2:
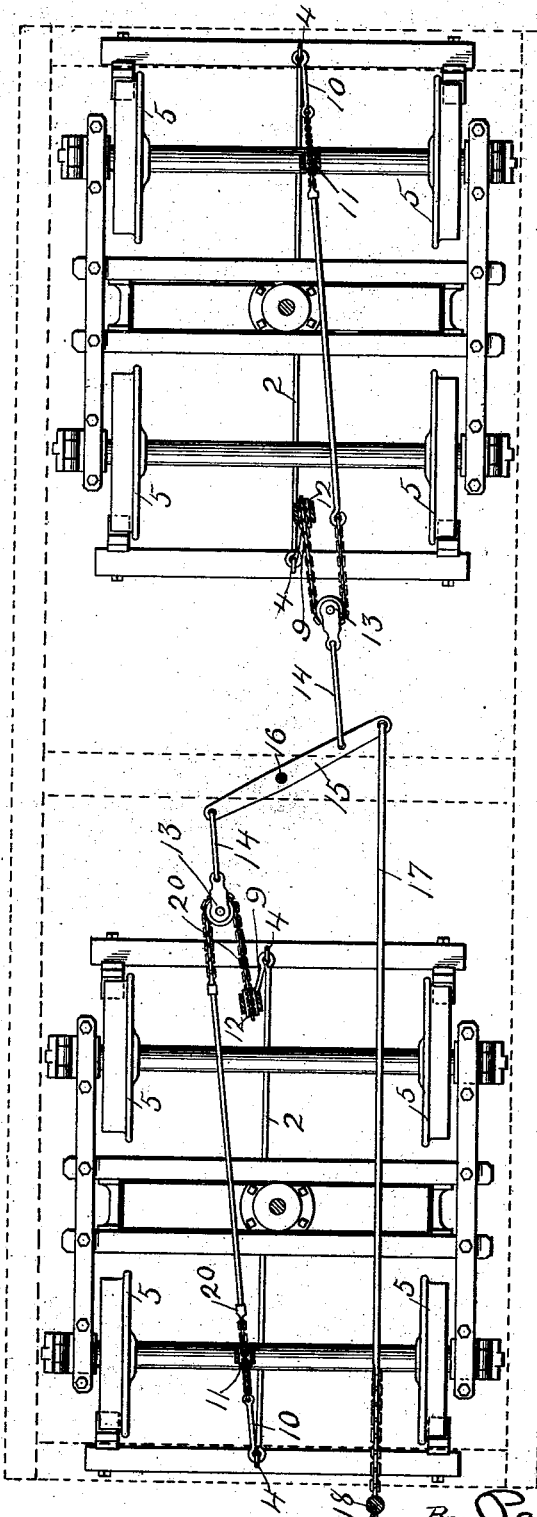

Figure 1 is a longitudinal vertical section of a car provided with brake apparatus embodying my invention. Fig. 2 is a plan view thereof with the car-body removed. Fig. 3 is a vertical section of a truck and showing a modified form of my apparatus. Fig. 4 is a similar view showing still another modification.

In the drawings I have shown a simple form of car truck, but it will be understood that my invention is applicable to any of the car trucks which are employed on passenger or freight cars, or street cars. The brake shoes and brake beams may also be of any desired construction. As shown, I connect the brake shoes of each truck by a strong connecting rod 2 secured thereto in any suitable manner, as by means of eye bolts 3 which preferably extend upward through the brake beams and furnish the eye fastenings 4 for the ends of the brake chains. The rod 2 is of such length as to permit the brake shoes to stand a slight distance away from the peripheries of the wheels 5, and the brake beams are normally supported by the usual hangers 6 depending from the sills 7 of the car body. The action of this device may be explained as follows: Both pairs of brake shoes being supported out of contact with the wheels the raising of one pair into contact with the adjacent wheels will act through the connecting rod 2 to pull the other pair of shoes in under the other wheels and into a very strong frictional engagement therewith; an engagement which automatically increases as the first shoes more strongly grip their upwardly revolving wheels. From the above it might be presumed that the action after the manual setting of the brake would be automatic to such an extent as to cause the raised shoes to so tightly engage their wheels as to lock and be drawn up past the center; but, this is clearly not the case for the action of the wheels upon the second or depressed shoes is to wedge the shoes, resulting in a back pull through the rod 2 upon the raised shoes, which pull effectually prevents the shoes from passing up beyond the centers of their wheels and doing so always holds them in position to drop of their own weight when the brake chain is slackened.

The brakes are automatic only to the extent that the frictional engagement between the raised shoes and their wheels which in addition to the original force applied to raise them acts to draw the depressed shoes against their wheels. For thus lifting either one of the shoes I may employ various forms of take-ups several of which I have illustrated. Of these I prefer the construction shown in Figs. 1 and 2, wherein a single loop or chain is employed for each truck, the ends 9 and 10 of the loop being secured upon opposite brake beams and the intermediate parts being carried upward over the fixed sheaves 11 and 12, the boxes of which are firmly secured upon the bottom of the car. The loop is embraced by a third sheave 13 from which a link 14 extends to the transverse lever 15 pivoted at 16 to the car. From the opposite end of this lever a chain or rod 17 extends to the end of the car and is arranged to be wound upon the lower end of the brake shaft or stem 18, ordinarily employed, or, it is obvious that an air brake device may be connected with the lever 15. When the lever 15 is drawn forward the brake chain loop will be drawn up to immediately set the brake shoes upon the wheels after which the action of the brake will be, to the extent explained, automatic. As an additional support for the downwardly drawn shoe I may provide a block 20 upon the brake chain before each of the sheaves 11 and 12, and so placed that it will engage with the sheave when the lower end of the chain is drawn down to the limit. The brake chain from the opposite truck is connected with the lever 15 in a similar manner.

In place of the above construction I may employ that shown in Fig. 3 where short chains 21 and 22 extend from the brake beams over the sheaves 11 and 12 and are provided upon their upper and inner ends with the sheaves or pulleys 23 and 24 respectively. These sheaves are connected by a chain 25 having its upper end secured to the car body or extending back to the similar chain of the truck beneath the other end of the car body. This chain passes around the sheaves and has its opposite end connected with the vertical brake shaft or stem 18, upon turning which the sheaves are drawn together to lift and set the shoes. In Figs. 1 and 3 I have shown the rod 2 made in two sections, the approaching ends of which are oppositely threaded to receive a turn buckle 27 by which the length of the connecting rod 2 may be adjusted. This device may be applied to the constructions shown in the other figures. In Fig. 4 the arrangement of the take-up is further modified, the short chains 28 and 29 from the brake shoes extending around the sheaves 30 and 31 which are connected by a link 32. The end of the chain 29 may be secured to the car body or connected with the similar chain of the other truck. The forward chain 29 has its end connected with the brake stem 18. In this case as in the others I may provide the limiting blocks 20. The advantages derived from either of these constructions are due primarily to the connection of opposite brake shoes by the rod 2 which limit the movement of the brake shoes with respect to the wheels thereby making necessary only a small amount of slack chain, which may be very readily and quickly taken up through the multiplying sheaves, as shown. A further advantage is derived from the disposal of several of the levers which are ordinarily employed beneath the car, one only being used in my device. It is obvious further that when the car is forced down by a heavy load the brake shoes will be dropped a corresponding distance owing to the fact that they are connected to the body by the hangers 6, which results in permitting the pair of shoes to rise a somewhat greater height upon their wheels when set thereon, thereby increasing the arc through which the pressure is exerted upon the wheels and consequently increasing the power of the brake.

Having thus described my invention, I claim as new and desire to secure by Letters Patent—

1. The combination, with the truck, of the brake-shoes and beams belonging thereto, with the rod 2 connecting said brake-beams, and means for lifting one pair of said shoes into contact with the wheels whereby the other pair of brake-shoes is drawn into engagement with the wheels adjacent thereto, substantially as and for the purpose set forth.

2. The combination, with a car-truck and the wheels thereof, of the brake-beams and brake-shoes to engage said wheels, hangers for said brake-beams, a rod 2 adjustably connecting said brake-beams and extending beneath the axles of the truck, and means for lifting either one of the beams and its shoes whereby the other shoes are set, substantially as and for the purpose set forth.

3. The combination, with the wheels and the axles, of means for mounting the car thereon, the brake-beams and brake-shoes arranged thereon to engage said wheels, a rod extending beneath the axles and connecting said brake-beams, fixed sheaves or pulleys 11 and 12, chains passing from said beams over said sheaves, and a manual take-up connected with the upper ends of said chains, substantially as and for the purpose set forth.

4. The combination, with the wheels and their axles, of the frame arranged thereon, the car body secured upon said frame, springs being interposed, the brake-beams and brake-shoes to engage said wheels, hangers extending from said car-body to support said beams, a rod 2 extending beneath the axles and connecting said beams, and means for raising either of said brake beams and its shoes, substantially as and for the purpose set forth.

5. The combination, with the car-body, of the wheeled-truck whereon said body is mounted, the brake-beams and brake-shoes to engage the wheels thereof, a rod 2 connecting said brake-beams, hangers for said beams, sheaves 11 and 12, fixed upon the car body, a chain loop having its sides extending over said sheaves and its ends extending to and secured upon opposite brake-beams, a sheave 13 engaging the end of said loop, and means for drawing out said sheave to raise said shoes, substantially as and for the purpose set forth.

6. The combination, with the car-body, of the wheeled-truck whereon the same is arranged, the brake-beams and brake-shoes to engage the wheels of said truck, an adjustable connecting rod 2 extending between said brake-beams, hangers for said beams, fixed sheaves 11 and 12, a chain loop extending over said sheaves and having its ends secured upon said beams, stops 20 provided on said chain before said sheaves, and means engaging with the end of the loop whereby the same is drawn out, substantially as and for the purpose set forth.

In testimony whereof I have hereunto set my hand this 7th day of February, A. D. 1893.

CLARENCE W. CARTER.

In presence of—
C. G. HAWLEY,
F. S. LYON.